United States Patent
Watts et al.

(10) Patent No.: US 10,502,852 B2
(45) Date of Patent: Dec. 10, 2019

(54) TRAVELING OCEAN BOTTOM SEISMIC SURVEY

(71) Applicant: ION Geophysical Corporation, Houston, TX (US)

(72) Inventors: Giles Frances Tanfield Watts, Dorchester (GB); Peter Graham Stewart, Houston, TX (US)

(73) Assignee: ION Geophysical Corporation, Houston, TX (US)

(*) Notice: Subject to any disclaimer, the term of this patent is extended or adjusted under 35 U.S.C. 154(b) by 140 days.

(21) Appl. No.: 15/271,715

(22) Filed: Sep. 21, 2016

(65) Prior Publication Data

US 2017/0082762 A1 Mar. 23, 2017

Related U.S. Application Data

(60) Provisional application No. 62/221,759, filed on Sep. 22, 2015.

(51) Int. Cl.
*G01V 1/38* (2006.01)

(52) U.S. Cl.
CPC .......... *G01V 1/3808* (2013.01); *G01V 1/3852* (2013.01); *G01V 2210/1427* (2013.01)

(58) Field of Classification Search
CPC .......... G01V 1/20; G01V 1/38; G01V 1/3808; G01V 1/3817; G01V 1/3852; G01V 2210/1427
USPC ............................ 367/15; 405/158, 170, 184
See application file for complete search history.

(56) References Cited

U.S. PATENT DOCUMENTS

| 5,682,357 A | 10/1997 | Rigsby | |
|---|---|---|---|
| 2007/0076524 A1* | 4/2007 | Howlid | G01V 1/201 367/15 |
| 2009/0052277 A1* | 2/2009 | Swanson | G01V 1/201 367/15 |
| 2010/0265793 A1 | 10/2010 | Fleure et al. | |

FOREIGN PATENT DOCUMENTS

WO 2010149589 A2 12/2010

OTHER PUBLICATIONS

International Search Report for International application No. PCT/US2016/053011, from European Patent Office, dated Dec. 16, 2016.

* cited by examiner

*Primary Examiner* — Ian J Lobo
(74) *Attorney, Agent, or Firm* — Holland & Hart LLP (57) ABSTRACT

Embodiments of a method and system for acquiring a marine seismic survey are described. One method may include depositing on a seafloor a line of cable sections extending in a first direction. The line of cable sections may have a first end and a second end and may include a plurality of seismic wavefield receivers. The method may also include moving the line of cable sections by collecting cable sections from the second end of the line and depositing cable sections at the first end of the line so that the line of cable sections travels in the first direction. At least one source vessel may be used to provide acoustical waveforms while the line of cable sections is moving. The acoustical waveforms may be received by the plurality of seismic wavefield receivers in the line of cable sections so as to enable generation of a seismic survey.

28 Claims, 11 Drawing Sheets

TRAVELING OCEAN BOTTOM SEISMIC SURVEY

CROSS REFERENCES

This application claims priority to U.S. provisional patent application No. 62/221,759, titled "TRAVELING OCEAN BOTTOM SEISMIC SURVEY" filed Sep. 22, 2015, the entirety of which is hereby incorporated by reference for all purposes.

BACKGROUND

The present disclosure generally relates to seismic data acquisition, and more specifically to ocean bottom seismic data acquisition systems.

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include emitting seismic energy into the Earth with a seismic energy source (e.g., air guns, vibrators, dynamite, etc.), and monitoring the Earth's response to the seismic source with one or more receivers in order to create an image of the subsurface of the Earth.

The response of the Earth to the seismic energy is typically recorded at a plurality of receivers that may be, for example, towed behind an acquisition vessel in a marine survey, or deposited on a seafloor. In the situation wherein the plurality of receivers are deposited on a seafloor, an acoustical source, for example, towed by a source vessel on a surface of the sea, may be used to direct acoustical waves towards the seafloor. The acoustical waves may penetrate the seafloor and continue to travel through the seabed. Boundaries within the seabed, however, may result in acoustical reflections. Thus, the plurality of receivers on the seafloor may receive the acoustical waveforms in the form of seismic wavefields as the waves are reflected back towards the seafloor from the boundaries in the seabed. The plurality of receivers on the seafloor may include one or more sensors, including a particle motion sensor, a pressure sensor, or both a particle motion sensor and a pressure sensor in proximity to one another. The particle motion sensor may be, for example, a three-component geophone or accelerometer that records vectorial velocity measurements of a reflected seismic wavefield. The pressure sensor may be, for example, a hydrophone that records scalar pressure measurements of the reflected seismic wavefield. By observing the reflected seismic wavefield detected by the receivers during the survey, geophysical data pertaining to the reflected signals may be acquired and this data may be used to form an image indicative of the subsurface near the survey location.

The resolution of the seismic survey is related to the resolution of the collected data, which is itself related to the density of source acoustical waveforms projected from the surface of the sea. A high resolution may require a corresponding high number of source waveforms, which may require a significant amount of time or resources. Efforts to reduce the time or resources, while balancing the time during which resources are used, may be desired.

DETAILED DESCRIPTION

Described herein are methods and systems for performing a traveling ocean bottom seismic survey. The traveling survey may entail depositing on a seafloor a line of cable sections extending in a first direction. The plurality of cable sections may include a plurality of seismic wavefield receivers. The line of cable sections may be moved by collecting cable sections from one end of the line and depositing cable sections at the other end of the line such that the line of cable sections travels. While the line of cable sections travels, at least one source vessel may be used to provide acoustical waveforms. The acoustical waveforms may be received by the seismic wavefield receivers so as to enable generation of a seismic survey. The generation of source waveforms to enable generation of the seismic survey of a predetermined resolution may be balanced with the moving of the line of cable sections so as to reduce downtime of any source vessels or cable-moving vessels.

Figure 1:
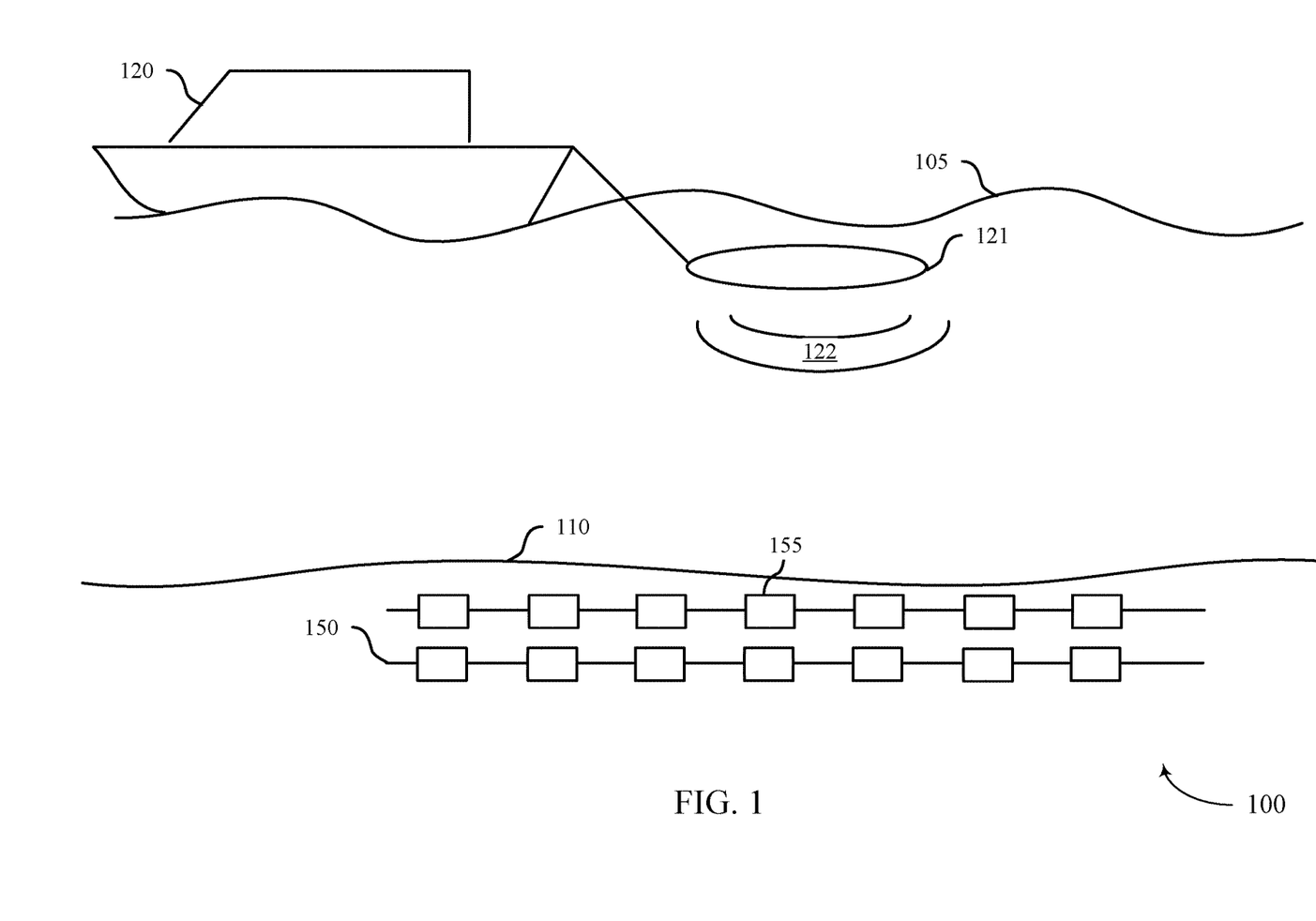
FIG. 1 is an illustration of an ocean bottom seismic survey system, in accordance with aspects of the present disclosure.

Turning now to the figures, FIG. 1 illustrates an ocean floor seismic survey system 100. While reference is made herein to an ocean, an ocean floor, a sea, and a seafloor, the present disclosure is not limited to any particular type of body of water. Rather embodiments of the present disclosure may be used in any marine environment includes oceans, lakes, rivers, etc. Accordingly, the use of the terms ocean, ocean floor, sea, or seafloor, and the like, should be broadly understood to include all bodies of water.

FIG. 1 illustrates that two or more cables 150 may be deposited on a seafloor 110. The cables 150 may be formed of ropes or wire. The cables 150 may include one or more seismic wavefield receivers 155. The seismic wavefield receivers 155 may be configured to receive acoustic waveforms 122, for example. The acoustic waveforms 122 may be generated by an acoustic source 121 that may be located near the surface 105 of the sea. As an example, the acoustic source 121 may be towed behind a source vessel 120 also located on the surface 105 of the sea. The acoustic waveforms 122 may be projected from the acoustic source 121 towards the seafloor 110. The acoustic waveforms 122 may enter the seafloor 110 and may travel through the seabed, reflecting back towards the seafloor 110 as the acoustic waveforms encounter subsurface boundaries. The seismic wavefield receivers 155 may receive the reflected waveforms in the form of a seismic wavefield. The seismic wavefield receivers 155 may collect and store data relating to the receipt of the seismic wavefields, including, for example, the timing, strength, direction, and velocity of the detected seismic wavefield. The seismic wavefield receivers 155 may store the collected data until the cable 150 and seismic wavefield receivers 155 are retrieved for analysis. Alternatively, the seismic wavefield receivers 155 may be equipped with a transmitter or modem to facilitate either wired or wireless transmission to the surface 105 for analysis. In a further alternative, the seismic wavefield receivers 155 may use a transmitter or modem to facilitate either wired or wireless transmission to a recording station that may be located either at the surface 105, at the seafloor 110, or any other location within the column of water between the surface 105 and the seafloor 110.

The resolution of the collected data and the resultant resolution of any seismic survey that may be generated from the collected data is related to, for example, sampling frequency by the seismic wavefield receivers 155, a density of the seismic wavefield receivers 155, and a density of source waveforms generated by one or more acoustic sources 121. Thus, for example, any number of cables 150 with any number of seismic wavefield receivers 155 may be used in generation of a seismic survey. However, the denser the cables 150 used, the greater potential that the collected data will have a higher resolution. Nevertheless, a high density of seismic wavefield receivers 155 may not guarantee a high resolution survey. For example, a dense network of seismic wavefield receivers 155 may still fail to provide data to enable generation of a high resolution survey if the acoustic source 121 fails to provide a sufficient number of acoustic waveforms 122 from a sufficient number of locations. Therefore, in order to provide a sufficient number of acoustic source waveforms from a sufficient number of locations, the source vessel 120 may travel over the survey area (for example, the area where the seismic wavefield receivers 155 are located), shooting acoustic waveforms towards the seafloor 110 while the source vessel 120 travels. In this way, a sufficient density of source waveforms may be generated to allow the plurality of seismic wavefield receivers 155 to collect data to allow generation of a seismic survey having a predetermined resolution.

While the above-described method may provide high resolution seismic surveys, including three-dimensional seismic surveys, the above-described method may be costly. Laying cables 150 with seismic wavefield receivers 155 over a large survey area may prove costly in terms of resources and may also take a significant amount of time. Additionally, once the cables 150 are deposited, traversing the survey area with a source vessel to generate a sufficient density of source waveforms may also take a considerable amount of time. Additional source vessels 120 may be used, which could reduce the amount of time required to conduct the survey, but at the cost of using additional resources. After the source vessels 120 complete their traversal of the survey area, and once the seismic wavefield receivers 155 have collected sufficient data, the cables 150 may be retrieved from the seafloor 110. A process that, once again, may take a considerable amount of time.

Therefore, efforts to reduce the cost and time required to take an ocean bottom seismic survey may be desired. For example, fewer cables 150 may be used. Patterns of movement of source vessels 120 may be established that would allow high resolution data to be collected even though fewer cables 150 are used. Additionally, the cables 150 may be laid in sections so as to facilitate the use of traveling cables such that shorter and fewer cable sections may be used for the survey. The taking of the survey may be balanced with the movement of the cables 150 so as to reduce or minimize any potential downtime by either the source vessels 120 or the vessels moving the cables 150, thus also effectively reducing waste and expense.

Figure 2:
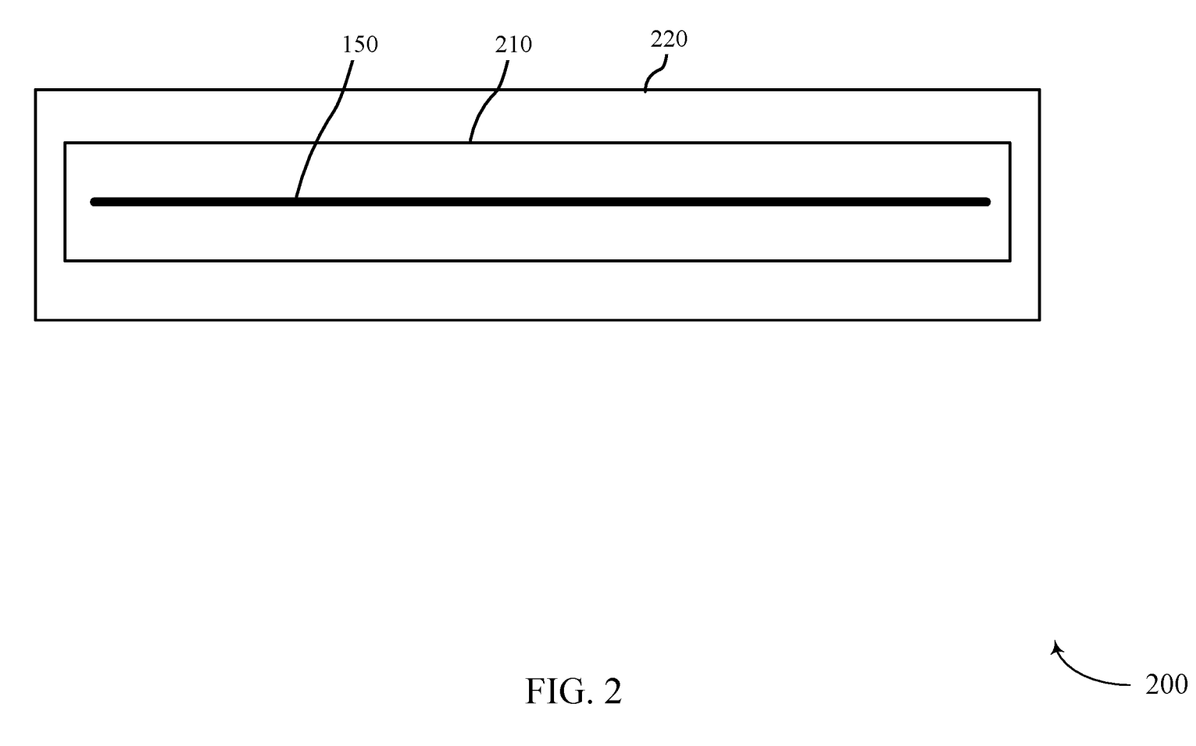
FIG. 2 is a top schematic view of an ocean bottom seismic survey system, in accordance with aspects of the present disclosure.

FIG. 2 illustrates a top schematic view of an ocean bottom seismic survey system 200 that may provide sufficient resolution for a three-dimensional survey over a narrow band of seafloor, while reducing costs and resources. The system 200 may include a single cable 150. The system 200 may be augmented to include an additional cable 150, as discussed below, but may be differentiated from other ocean floor seismic survey methods that utilize many parallel cables 150. Also illustrated in FIG. 2 is a shot grid 220 and a resulting data swath 210. While only one cable 150 is illustrated in this example, the resulting data swath 210 is wider than the width of the cable 150. This may be the result of using one or more source vessels to traverse back and forth over the cable 150 within an area defined as a shot grid 220. The shot grid 220 is that area in which the one or more source vessels "shoot" acoustic waveforms towards the seafloor. The acoustic waveforms may thus be shot from multiple locations relative to the cable 150, The resultant survey generated from use of the system 200 will have a long inline offset in the direction of the cable 150 and a much shorter cross line offset in a direction orthogonal to the direction of the cable 150. In one example, the cross line offset used by the source vessels may be approximately 8 km on either side of the cable 150 (meaning that the shot grid 220 extended approximately 8 km on either side of the cable 150). Such an offset may result in a data swath 210 that is approximately 8 km wide (4 km on either side of the cable 150). The data density may be set by the economics of the survey. A survey with high resolution expectations will necessarily require a higher density of source acoustic wave projections. The source acoustic wave projections may be projected at a predetermined density from within the shot grid 220.

Figure 3:
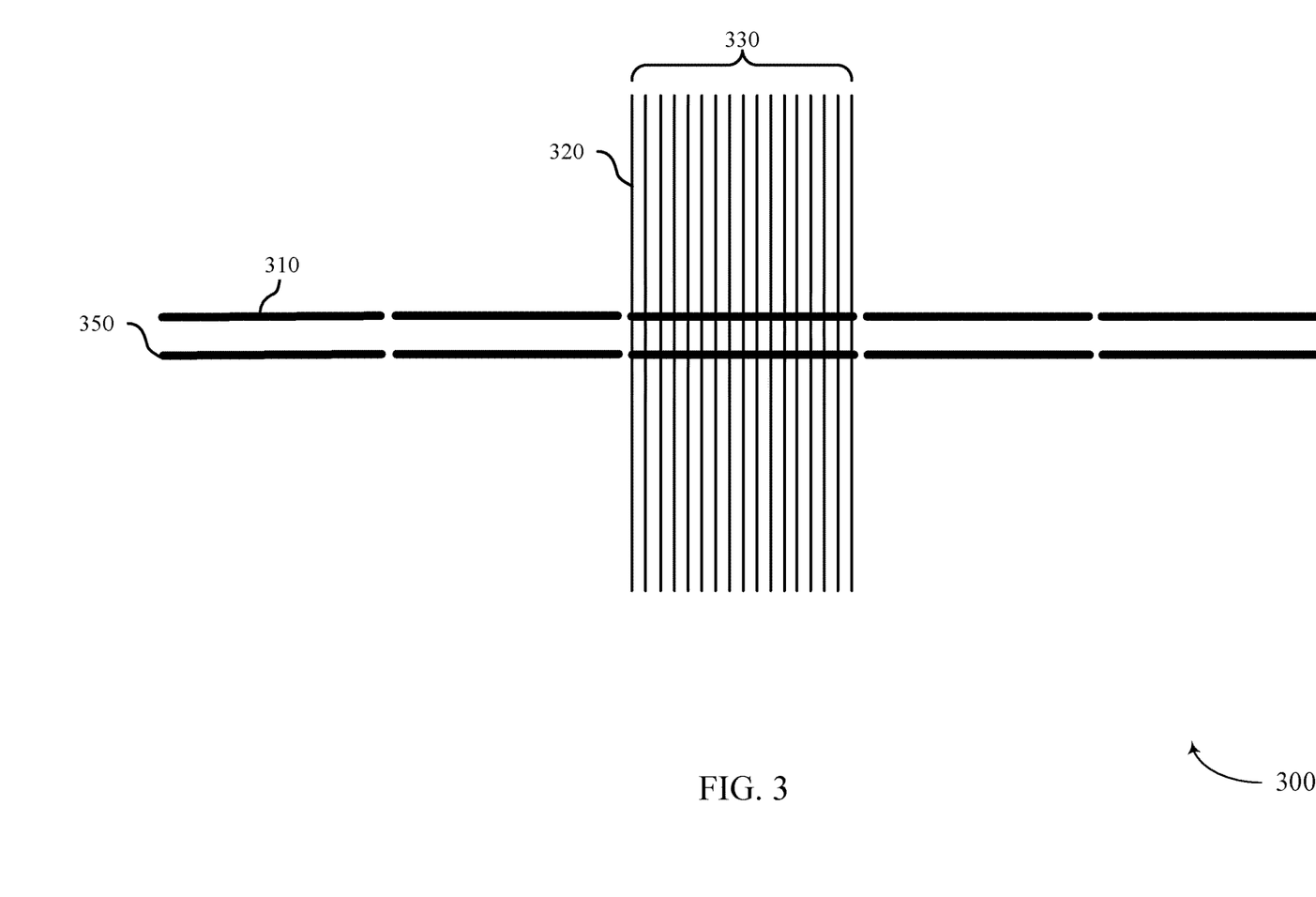
FIG. 3 is a top schematic view of an ocean bottom seismic survey system, in accordance with aspects of the present disclosure.

FIG. 3 also illustrates a top schematic view of an ocean bottom seismic survey system 300. The system 300 provides additional details and variations of the system 200 illustrated in FIG. 2. In system 300, two cable lines 350 of cable sections 310 are used. The use of cable sections 310 instead of single cables 150 may allow for use of a traveling ocean bottom survey, as further explained below. Cable sections 310 may be of any size, and need not necessarily be of equal sizes. However, equal sized cable sections 310 are preferred for use with a traveling ocean bottom survey. In one example, cable sections 310 may each be approximately 6 km long. Thus, FIG. 2 illustrates an example configuration of two cable lines 350 of cable sections 310, each cable line 350 including five cable sections 310 such that each cable line 350 is approximately 30 km long. The cable lines 350 may be separated by a predetermined distance, such as, for example, 400 m. The cable lines 350 may include seismic wavefield receivers in accordance with a predetermined spacing along the cable lines 350. In one example, the predetermined seismic wavefield receivers may be spaced 25 m apart.

Superimposed and orthogonal to the cable lines 350 are shot lines 320, representing lines of travel used by one or more source vessels towing acoustic sources. By traveling across the cable lines 350 to a predetermined cross line offset and by shooting acoustic waves at a predetermined spacing or frequency, a desired density of data may be collected so as to enable generation of a seismic survey with a desired resolution. In one example, the cross line offset from each cable line 350 is 8 km. The shot lines 320 may be separated from each other by a predetermined distance, such as 100 m, meaning that, in the example of FIG. 3, 60 shot lines may be used to provide a swath 330 of data over the length of a cable section 310. The shot spacing may be, for example, 50 m. The shot spacing, the shot line spacing, the cable line spacing, and the seismic wavefield receiver spacing may all be varied based on the needs of the survey. Additionally, while FIG. 3 illustrates disconnected shot lines 320, one or more of the shot lines 320 may be connected, meaning that one or more source vessels may continue towing and shooting acoustic sources while turning to travel along adjacent shot lines 320. Therefore, shot lines 320 may be disconnected, connected, or a combination thereof.

Figure 4:
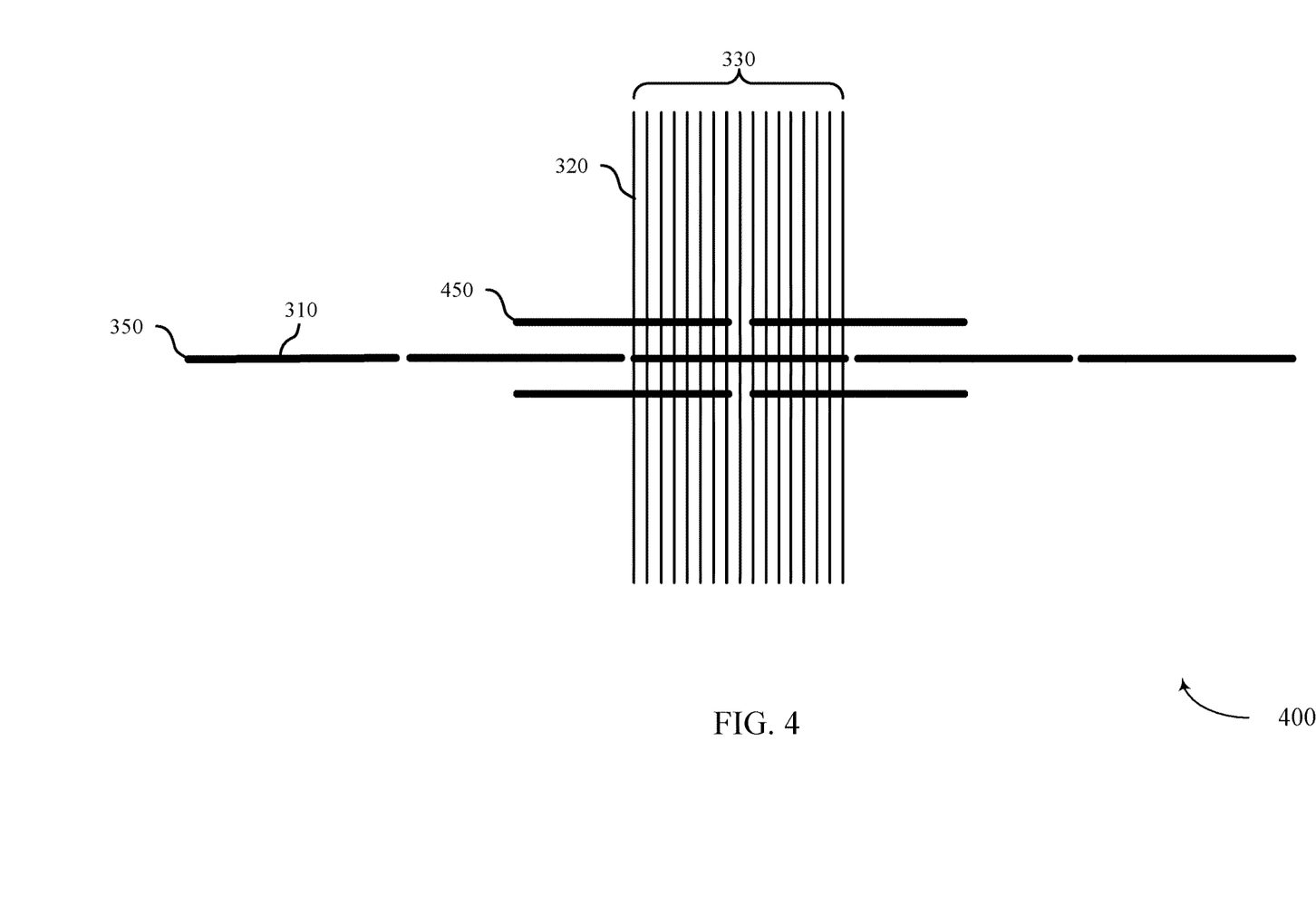
FIG. 4 is a top schematic view of an ocean bottom seismic survey system, in accordance with aspects of the present disclosure.

FIG. 4 illustrates another example of a top schematic view of an ocean bottom seismic survey system 400. The system 400 is a variation of system 300 illustrated in FIG. 3. In system 400, a single cable line 350 is provided in the direction of the inline axis. Instead of providing two cable lines 350 of equal lengths, additional partial cable lines 450 may be provided that are of shorter length and that are only in the vicinity of the shot swath 330.

Figure 5:
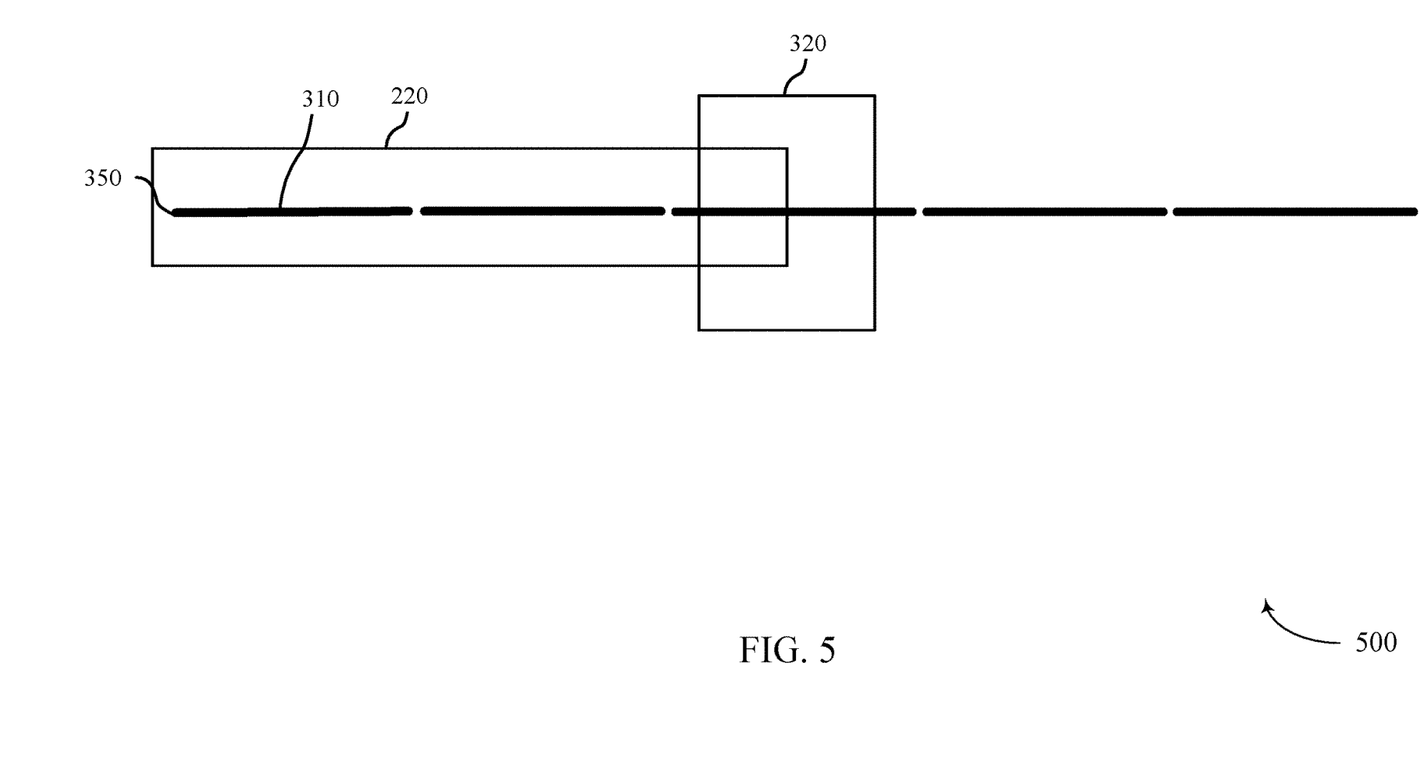
FIG. 5 is a top schematic view of an ocean bottom seismic survey system, in accordance with aspects of the present disclosure.

One advantage to using cable lines 350, 450 of cable sections 310 instead of long cables 150 is that the cable sections 310 may be moved without needing to move the entire cable 150. Additionally, the shot grid may be covered by a swath 320 that moves in the direction that a cable line 350, 450 is moved. FIG. 5 illustrates a basic example of this concept.

FIG. 5 illustrates a top schematic view of an ocean bottom seismic survey system 400. The system 500 includes a cable line 350 which itself includes a plurality of cable sections 310. A moving shot swath 320 is used to collect data over a data swath 220. Thus, in the example of FIG. 5, one or more source vessels may be used to transverse the cable line 350 over a moving shot swath 320. The moving shot swath 320 would have begun near one end of the cable line 350 and traveled in a direction of the other end of the cable line 350. The resultant data swath 220 in the wake of the moving shot swath 320 may be used to generate a seismic survey.

Figure 6:
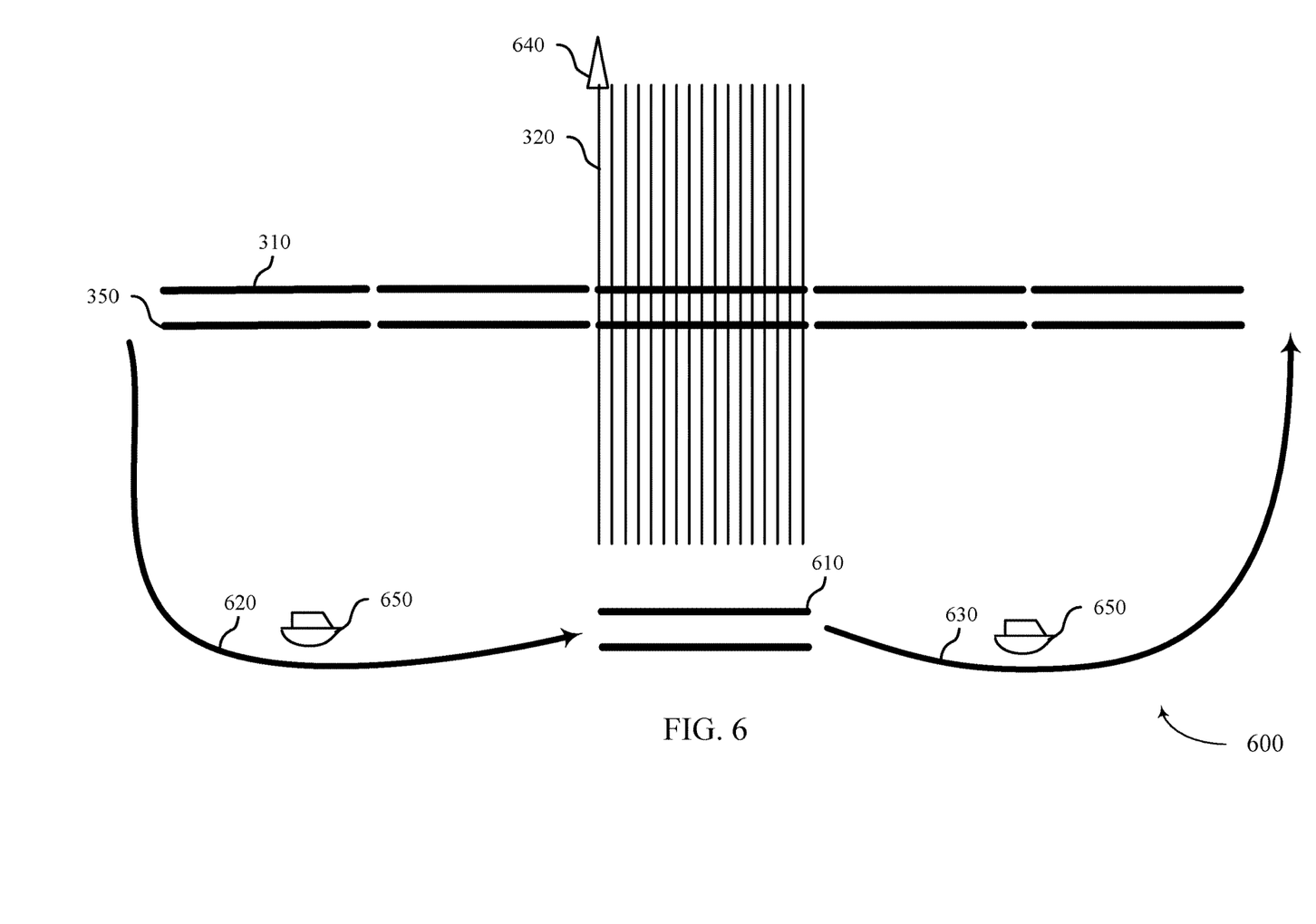
FIG. 6 is a top schematic view of a traveling ocean bottom seismic survey system, in accordance with aspects of the present disclosure.

FIG. 6 is a top schematic view of a traveling ocean bottom seismic survey system 600. Like system 300 of FIG. 3, the system 600 includes two cable lines 350. However, fewer or more cable lines 350, or even partial cable lines 450 could be included. As was illustrated in system 500, shot swath 320 may be a moving shot swath, while cable lines 350 may be traveling cable lines. In order to facilitate travel of the cable lines 350, the cable lines 350 may be made up of cable sections 310. Thus, cable sections 310 from a first end of the cable lines 350 may be moved to a second or other end of the cable lines 350 while the shot swath 320 moves in the same direction.

As an example, system 600 includes two cable lines 350, each with five cable sections 310. As explained above, the cable sections 310 may be of any length. System 600 also illustrates that two cable sections 310 are being moved, and are thus designated as rolling cable sections 610. The rolling cable sections 610 are moved from one end of the cable lines 350 via route 620 using a cable-moving vessel 650, and are moved to the other end of the cable lines 350 via route 630. The rolling cable sections 610 are deposited at the forward end of the cable lines 350, meaning the end in which the shot swath 320 is moving.

One benefit of implementing system 600 is that fewer resources need be deployed in order to obtain a seismic survey. Using one, two, or even three complete or partial cable lines 350, 450 may result in significant savings in resources over the use of many more cables 150. Applying a back-and-forth shot line pattern by a source vessel still allows for the generation of a three-dimensional survey even though a minimal number of cable lines 350 are used. Additionally, by using rolling cable sections 610, instead of depositing an entire cable line 350 at once, means that fewer cable sections 310 need be used.

An additional benefit of system 600 may be realized by balancing the time used to provide acoustic waveforms by a source vessel with a time required to move the rolling cable sections 610. If, for example, rolling cable sections 610 can be moved from one end of cable lines 350 to the other end in an amount of time that is significantly less than that required to provide source acoustic waveforms for an equivalent number of cable sections 310, then the vessels used to transport the rolling cable sections 610 will be idle while waiting for the source vessels to complete a shot swath 320. This idle time may result in not only lost time, but greater expenses. Therefore, adjustments may be made in order to approximately match or balance the time spent moving rolling cable sections 610 with the time spent providing source acoustic waveforms to an equivalent number of cable sections 310.

In system 600 of FIG. 6, one source vessel 640 is illustrated. In certain circumstances, the time required for one source vessel 640 to provide a sufficient number of source acoustic waveforms for a seismic survey having a desired resolution may be approximately equal to the time required to move the rolling cable sections 610 from one end of the cable lines 350 to the other. In this scenario, the system 600 would be considered balanced, with a resource and time wastage being minimized.

In certain circumstances, system 600 may not be balanced, meaning that the source vessel 640 may require a longer time to conduct a survey over a number of cable sections 310 than it would take to move the same number of rolling cable sections 610. In these circumstances, additional adjustments may be made.

Figure 7:
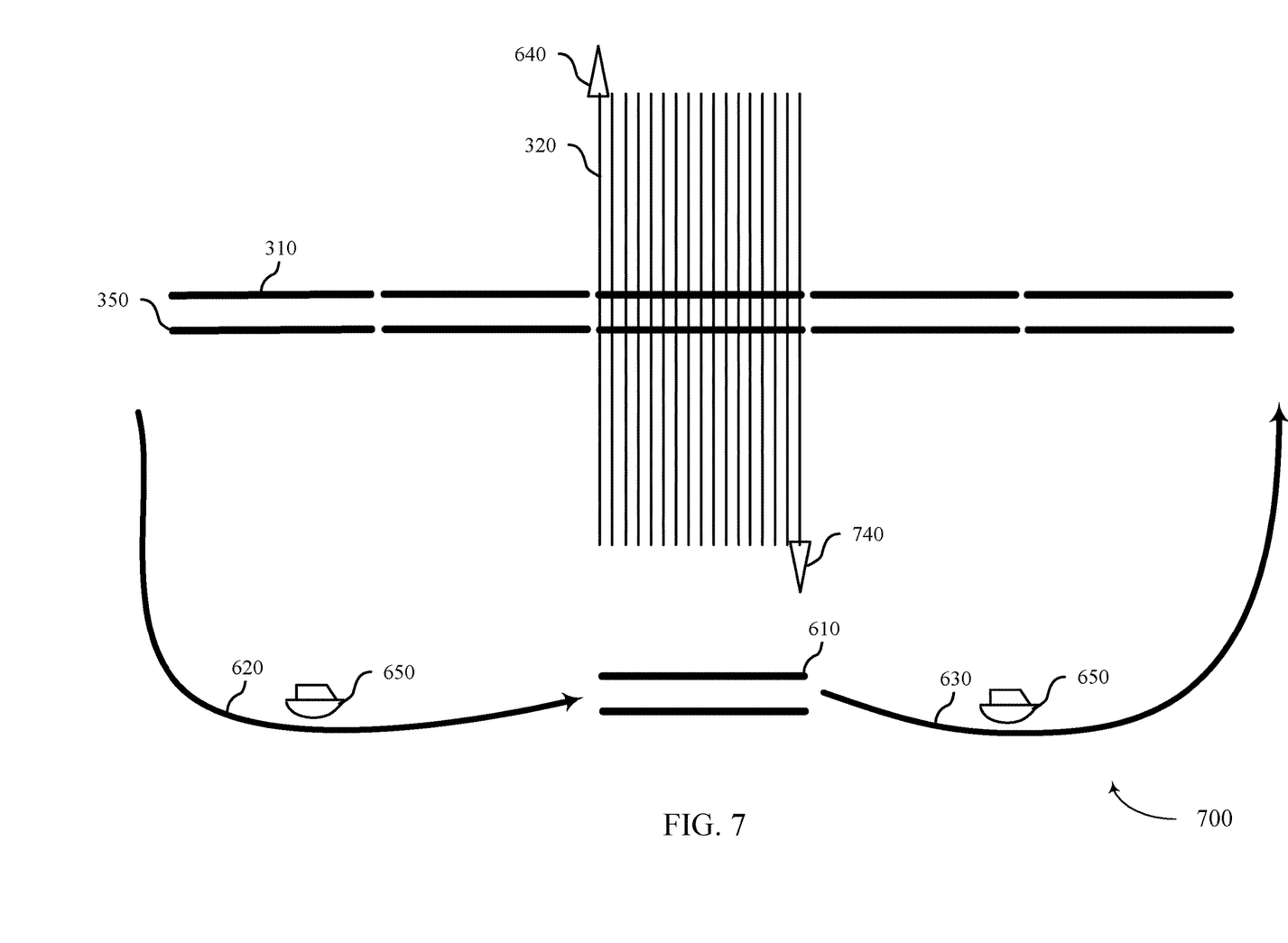
FIG. 7 is a top schematic view of a traveling ocean bottom seismic survey system, in accordance with aspects of the present disclosure.

FIG. 7 illustrates one of the possible adjustments. FIG. 7 is a top schematic view of a traveling ocean bottom seismic survey system 700. In system 700, an additional source vessel 740 has been added to speed the provision of source acoustic waveforms. Additional source vessels may be added, if necessary, though the goal is not to perform the provision of source acoustic waveforms as fast as possible, but merely to match the amount of time necessary to move an equivalent number of rolling cable sections 610.

Figure 8:
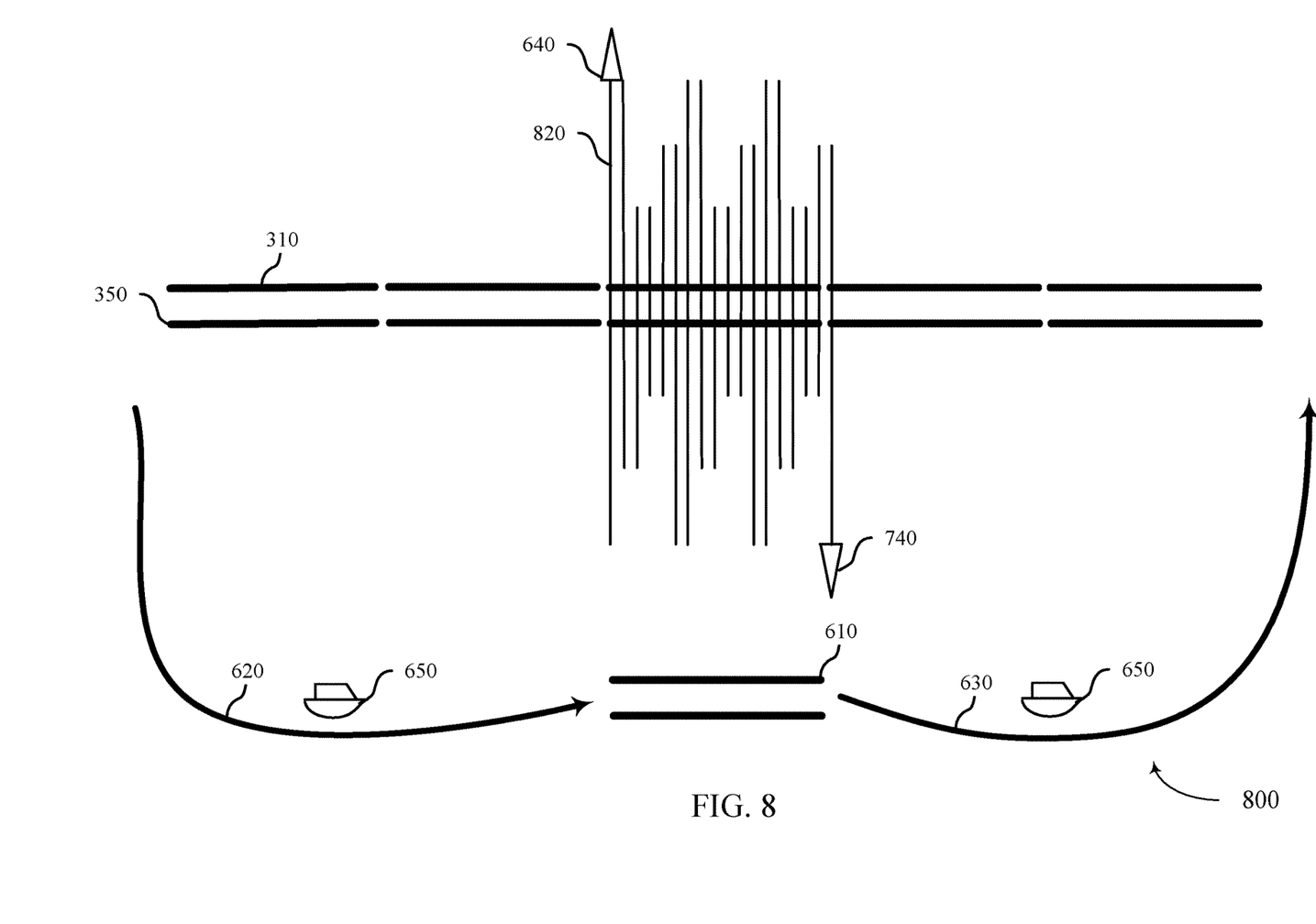
FIG. 8 is a top schematic view of a traveling ocean bottom seismic survey system, in accordance with aspects of the present disclosure.

FIG. 8 illustrates yet another possible adjustment. FIG. 8 is a top schematic view of a traveling ocean bottom seismic survey system 800. In system 800, not only has an additional source vessel 740 been added, the cross line offsets traveled by the source vessels 640, 740 have been staggered. The staggered offsets 820 allow the source vessels 640, 740 to complete the provision of source acoustic waveforms in even less time because the source vessels 640, 740 have less distance to cover.

The use of staggered offsets 820 also has a minimal effect on the quality of the data collected for the seismic survey. Providing source acoustic waveforms from a variety of locations offset from the cable line 350 is necessary in order to provide three-dimensional survey results. However, a source grid with equal length source lines generates trace numbers with the square of the offset so there are many more long offsets than short offsets. This can lead to a long offset bias in the dataset with associated signal processing problems.

Additionally, imaging theory instructs that longer offsets do not need to be sampled as frequently as short offsets in order to characterize a wavefield. Further, the very longest cross line offsets are generally used for seismic velocity analysis only, and thus have a different sampling criteria than those typically used for generating the seismic survey results.

Accordingly, the density of provided source acoustic waveforms near the edges of a shot grid (for example, near a maximum cross line offset value) may be reduced without adversely affecting the resulting collected data.

Therefore, staggered offsets 820 may be used. In system 800, a specific pattern of staggered offsets 820 is illustrated. For example, the staggered offsets may vary from a quarter of a maximum offset, a third of a maximum offset, or a half of a maximum offset. However, patterns other than that shown in FIG. 8 may also be used, as long as the patterns maintain a higher shot density near the cable lines 350 than near a maximum offset. As discussed above with respect to FIG. 3 (and as may be applied to FIGS. 4, 6 and 7), the staggered offsets 820 may be connected, meaning that one or more source vessels may continue towing and shooting acoustic sources while turning to travel along adjacent staggered offsets 820. Therefore, staggered offsets 820 may be disconnected, connected, or a combination thereof.

Other factors and operations may be applied to the systems 600, 700, 800 in order to improve the quality of the resulting seismic survey. For example, mirror imaging and multiple imaging algorithms may be used during processing to more fully account for the various reflections leading to the received wavefields. Additionally, the maximum inline offset may be selected based on the length of the cable lines 350. As longer maximum inline offsets may provide additional data regarding subsurface structures, long cable lines 350 may also be desirable. For example, for maximum inline offsets of from 16 to 20 km, a cable line 350 of at least 40 km would be desirable. In order to keep up with the rolling or traveling nature of the cable line 350, some additional length may also be desirable. Thus, a 50 km cable line 350 may be an example of a desirable length of cable line 350 to support maximum inline offsets of 16 to 20 km. Maximum inline offsets of this length may facilitate undershooting of various geologic features such as basalt intrusions, salt pillows, mud volcanos, thrust belts, and other structures that may otherwise adversely affect the seismic image. Cable sections 310 that are between 8 and 12 km long would allow implementation of a 50 km cable line 350 using from 4 to 6 cable sections 310.

If two or more cable lines 350 are used, the cable lines 350 may be separated by a distance that provides at least some overlap between images generated using up-going wavefields and down-going wavefields.

Further reductions in shot effort or improvements to shot density may result from the use of a dual source flip-flop source vessel. Using a dual source flip-flop source vessel may allow the number of sail lines to be reduced, as a single sail line may be used to generate multiple shot lines.

Additionally, simultaneous shot methods may be used, wherein shots from different source vessels are performed as fast as possible and independent of other source vessels so as to reduce potential interference—the randomness of the shooting patterns may be used cancel out potential interference.

The number of shot lines used within a swath may also be varied, if necessary, in order to adjust the speed and/or resolution of the provision of source acoustic waveforms. Decreasing the density of the shot lines may increase the speed, but may also result in a decrease in resolution. Thus, any change in the density of shot lines must be balanced with the ability to achieve a desired survey resolution.

Figure 9:
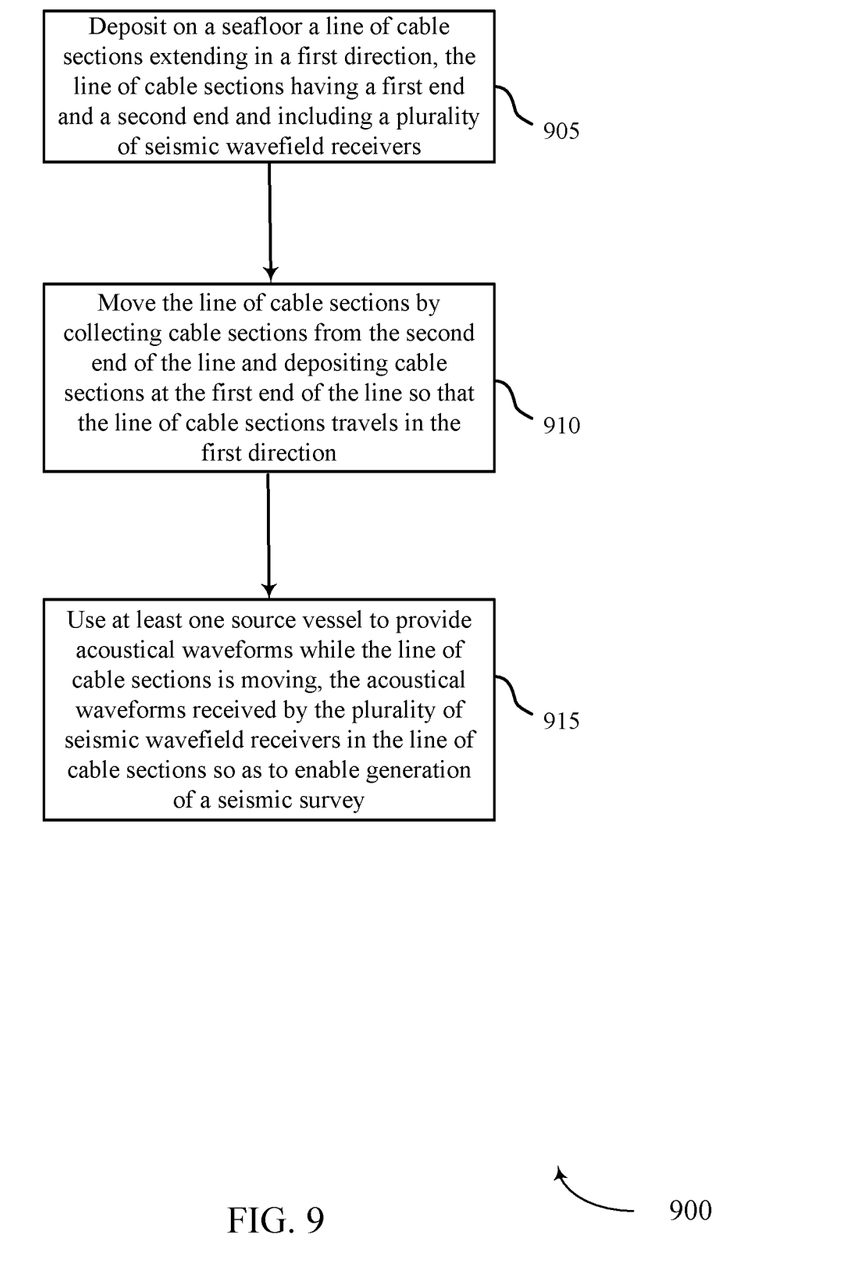
FIG. 9 is a flowchart illustrating a method of performing a traveling ocean bottom seismic survey, in accordance with aspects of the present disclosure.
Figure 10:
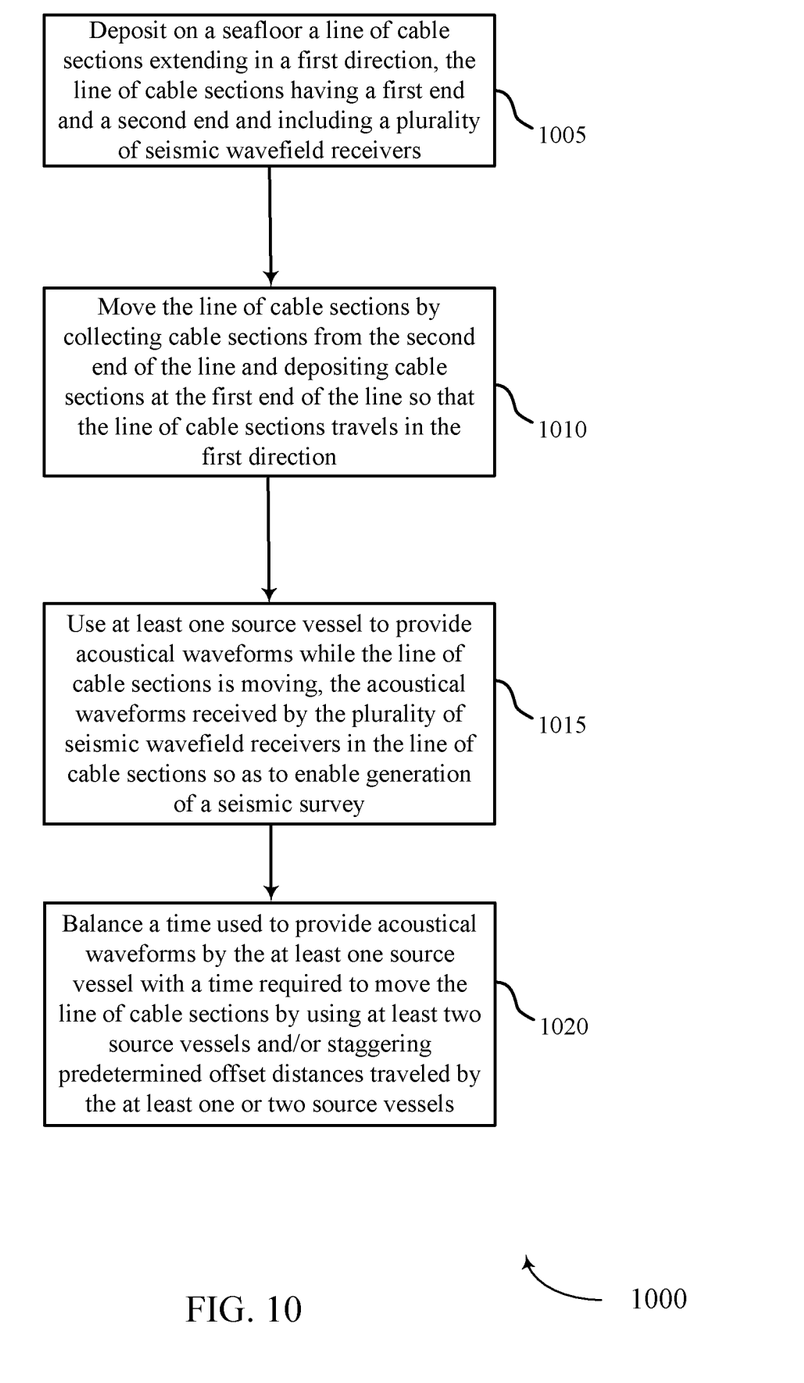
FIG. 10 is a flowchart illustrating a method of performing a traveling ocean bottom seismic survey, in accordance with aspects of the present disclosure.

Referring now to FIGS. 9 and 10, these figures illustrate example methods for implementing the disclosed traveling ocean bottom seismic survey described above. In particular, methods 900 and 1000 of FIGS. 9 and 10 relate to the systems 500, 600, 700, and 800 of FIGS. 5-8.

At step 905 of method 900 (of FIG. 9), the method 900 includes depositing on a seafloor a line of cable sections extending in a first direction, the line of cable sections having a first and a second end and including a plurality of seismic wavefield receivers. The operations of step 905 may be performed by a vessel used to deposit cables on a seafloor, as illustrated in FIGS. 1-8.

At step 910, the method 900 includes moving the line of cable sections by collecting cable sections from the second end of the line and depositing cable sections at the first end of the line so that the line of cable sections travels in the first direction. The operations of step 910 may be performed by a vessel used to deposit and move cables on a seafloor, as illustrated in FIGS. 1-8.

At step 915, the method 900 includes using at least one source vessel to provide acoustical waveforms while the line of cable sections is moving, the acoustical waveforms received by the plurality of seismic wavefield receivers in the line of cable sections so as to enable generation of a seismic survey. The operations of step 915 may be performed by a source vessel used to provide source acoustic waveforms, as illustrated in FIGS. 1-8.

FIG. 10 illustrates an additional example method for implementing the disclosed traveling ocean bottom seismic survey described above.

At step 1005, the method 1000 includes depositing on a seafloor a line of cable sections extending in a first direction, the line of cable sections having a first and a second end and including a plurality of seismic wavefield receivers. The operations of step 1005 may be performed by a vessel used to deposit cables on a seafloor, as illustrated in FIGS. 1-8.

At step 1010, the method 1000 includes moving the line of cable sections by collecting cable sections from the second end of the line and depositing cable sections at the first end of the line so that the line of cable sections travels in the first direction. The operations of step 1010 may be performed by a vessel used to deposit and move cables on a seafloor, as illustrated in FIGS. 1-8.

At step 1015, the method 1000 includes using at least one source vessel to provide acoustical waveforms while the line of cable sections is moving, the acoustical waveforms received by the plurality of seismic wavefield receivers in the line of cable sections so as to enable generation of a seismic survey. The operations of step 1015 may be performed by a source vessel used to provide source acoustic waveforms, as illustrated in FIGS. 1-8.

At step 1020, the method 1000 includes balancing a time used to provide acoustical waveforms by the at least one source vessel with a time required to move the line of cable sections. The times for providing acoustical waveforms and for moving the line of cable sections may be balanced by using at least two source vessels. Additionally or alternatively, the times for providing acoustical waveforms and for moving the line of cable sections may be balanced by staggering predetermined offset distances traveled by the at least one or two source vessels. The operations of step 1020 may be performed by both a vessel used to deposit and move cables on a seafloor as well as a source vessel used to provide source acoustic waveforms, as illustrated in FIGS. 1-8.

While the above disclosure has focused on the use of cables equipped with one or more seismic wavefield receivers to receive acoustic waveforms, a non-cable solution may also be used. In a non-cable solution, individual seismic wavefield receivers may be deposited and collected independent of cables. These independent seismic wavefield receivers or ocean bottom nodes may be deployed and collected using, for example, a remotely operated vehicle, or ROV, which may be controlled from a vessel on the ocean surface. Thus an ROV may be used to replace the cables described above in depositing and collecting seismic wavefield receivers. In this situation, and as described above, the seismic wavefield receivers may store data collected while the receivers are located on the ocean floor—the data may be available for analysis when the seismic wavefield receivers are retrieved. Alternatively, the seismic wavefield receivers may be equipped with a transmitter or modem to facilitate wireless transmission to the ocean surface for analysis.

Figure 11:
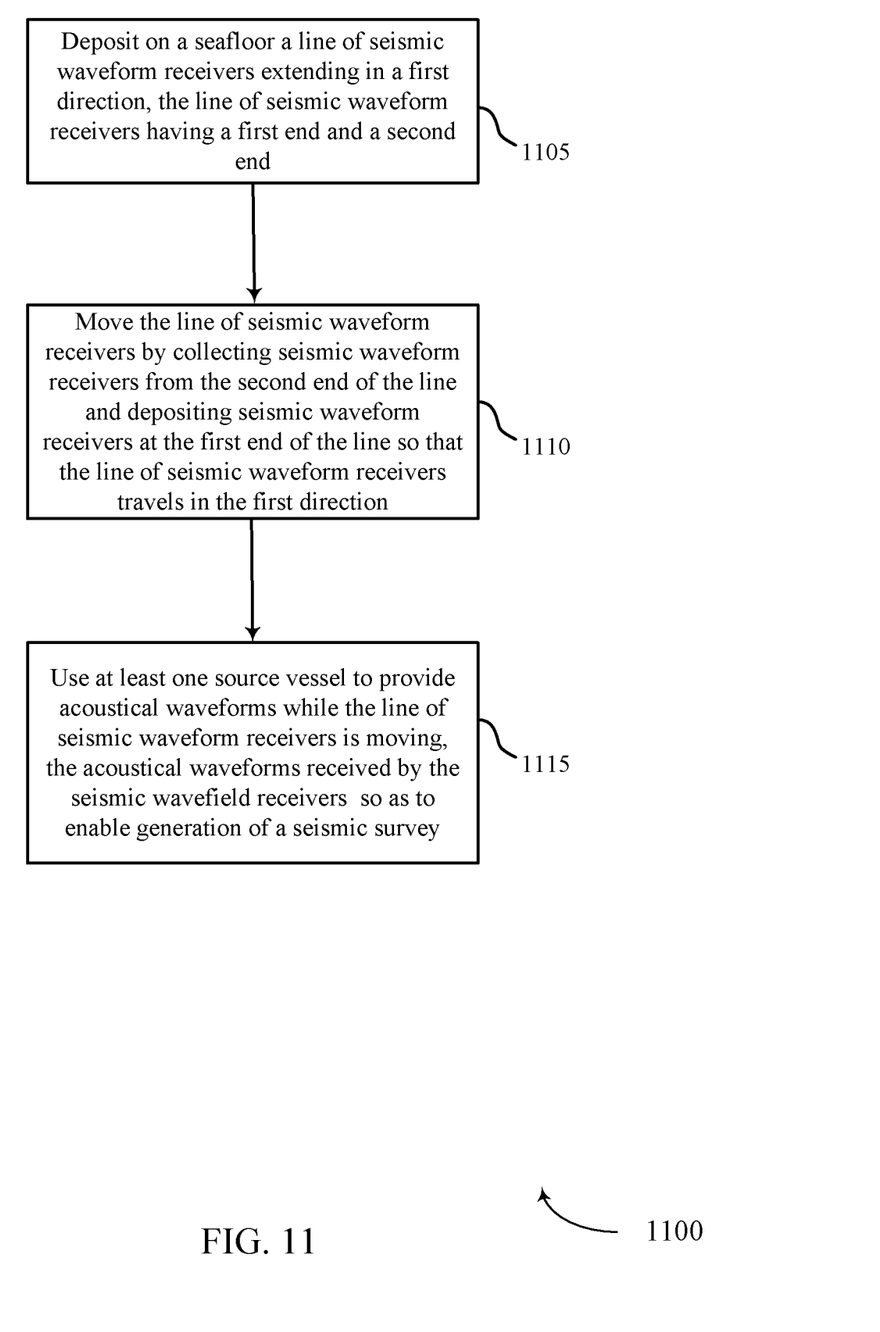
FIG. 11 is a flowchart illustrating a method of performing a traveling ocean bottom seismic survey, in accordance with aspects of the present disclosure.

FIG. 11 illustrates an example method 1100 for implementing the disclosed traveling ocean bottom seismic survey described above. In particular, method 1100 relates to the systems 500, 600, 700, and 800 of FIGS. 5-8, though method 1100 encompasses a non-cable solution, as described above.

At step 1105 of method 1100, the method 1100 includes depositing on a seafloor a line of seismic waveform receivers extending in a first direction, the line of seismic waveform receivers having a first and a second end. The operations of step 1105 may be performed by a remotely operated vehicle used to deposit seismic waveform receivers on a seafloor, having the same effect as depositing a line of cables having seismic waveform receivers, as illustrated in FIGS. 1-8. Alternatively, the operations of step 1105 may be performed with cables, where the seismic waveform receivers are attached to one or more cables, as illustrated in FIGS. 1-8.

At step 1110, the method 1100 includes moving the line of seismic waveform receivers by collecting seismic waveform receivers from the second end of the line and depositing seismic waveform receivers at the first end of the line so that the line of seismic waveform receivers travels in the first direction. The operations of step 1110 may be performed by a vessel used to deposit and move seismic waveform receivers on a seafloor, either as attached to cables (as illustrated in FIGS. 1-8) or as stand-alone nodes.

At step 1115, the method 1100 includes using at least one source vessel to provide acoustical waveforms while the line of seismic waveform receivers is moving, the acoustical waveforms received by the seismic wavefield receivers so as to enable generation of a seismic survey. The operations of step 1115 may be performed by a source vessel used to provide source acoustic waveforms, as illustrated in FIGS. 1-8.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments. Further, all relative and directional references used herein are given by way of example to aid the reader's understanding of the particular embodiments described herein. They should not be read to be requirements or limitations, particularly as to the position, orientation, or use of the invention unless specifically set forth in the claims.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

What is claimed is:

1. A method of acquiring a marine seismic survey, comprising:
   depositing on a seafloor a line of cable sections extending in a first direction, the line of cable sections having a first end and a second end and comprising a plurality of cable sections aligned end-to-end in the first direction, the line of cable sections including a plurality of seismic wavefield receivers;
   moving the line of cable sections by collecting cable sections from the second end of the line and depositing cable sections at the first end of the line so that the line of cable sections travels in the first direction; and
   using at least one source vessel to provide acoustical waveforms while the line of cable sections is moving, the acoustical waveforms received by the plurality of seismic wavefield receivers in the line of cable sections so as to enable generation of a seismic survey.

2. The method of claim 1, further comprising:
   balancing a time used to provide acoustical waveforms by the at least one source vessel with a time required to move the line of cable sections.

3. The method of claim 1, wherein using the at least one source vessel to provide acoustical waveforms comprises:
   moving the at least one source vessel back-and-forth across the line of cable sections while providing the acoustical waveforms.

4. The method of claim 3, wherein moving the at least one source vessel back-and-forth comprises:
   moving the at least one source vessel a predetermined offset distance orthogonal to the line of cable sections.

5. The method of claim 4, further comprising:
   staggering the predetermined offset distances traveled by the at least one source vessel.

6. The method of claim 5, further comprising:
   balancing a time used to provide acoustical waveforms by the at least one source vessel with a time required to move the line of cable sections by adjusting the staggering of the predetermined offset distances traveled by the at least one source vessel.

7. The method of claim 5, further comprising:
   using at least two source vessels to provide acoustical waveforms while the line of cable sections is moving.

8. The method of claim 5, further comprising:
balancing a time used to provide acoustical waveforms by the at least two source vessels with a time required to move the line of cable sections by adjusting the staggering of the predetermined offset distances traveled by the at least one source vessel.

9. The method of claim 1, further comprising:
balancing a time used to provide acoustical waveforms by the at least one source vessel with a time required to move the line of cable sections by adjusting a number of source vessels used to provide acoustical waveforms and by staggering an offset distance traveled by each of the at least one source vessel while providing the acoustical waveforms.

10. The method of claim 1, further comprising:
acquiring three-dimensional image data for generation of the seismic survey while balancing a time used to provide acoustical waveforms by the at least one source vessel with a time required to move the line of cable sections.

11. A system of acquiring a marine seismic survey, comprising:
at least one cable vessel for depositing on a seafloor a line of cable sections extending in a first direction, the line of cable sections having a first end and a second end and comprising a plurality of cable sections aligned end-to-end in the first direction, the line of cable sections including a plurality of seismic wavefield receivers, and for moving the line of cable sections by collecting cable sections from the second end of the line and depositing cable sections at the first end of the line so that the line of cable sections travels in the first direction; and
at least one source vessel for providing acoustical waveforms while the line of cable sections is moving, the acoustical waveforms received by the plurality of seismic wavefield receivers in the line of cable sections so as to enable generation of a seismic survey.

12. The system of claim 11, wherein the at least one cable vessel and the at least one source vessel are configured to balance a time used to provide acoustical waveforms by the at least one source vessel with a time required to move the line of cable sections.

13. The system of claim 11, wherein the at least one source vessel is configured to move back-and-forth across the line of cable sections while providing the acoustical waveforms.

14. The system of claim 13, wherein the at least one source vessel is configured to move a predetermined offset distance orthogonal to the line of cable sections.

15. The system of claim 14, wherein the at least one source vessel is configured to stagger the predetermined offset distances traveled.

16. The system of claim 15, wherein the at least one cable vessel and the at least one source vessel are configured to balance a time used to provide acoustical waveforms by the at least one source vessel with a time required to move the line of cable sections by adjusting the staggering of the predetermined offset distances traveled by the at least one source vessel.

17. The system of claim 15, further comprising:
a second source vessel to provide acoustical waveforms while the line of cable sections is moving.

18. The system of claim 15, wherein the at least one cable vessel and the at least one source vessel and second source vessel are configured to balance a time used to provide acoustical waveforms by the at least one source vessel and the second source vessel with a time required to move the line of cable sections by adjusting the staggering of the predetermined offset distances traveled by the at least one source vessel and the second source vessel.

19. A non-transitory computer-readable medium storing computer-executable code for acquiring a marine seismic survey, the code executable by a processor to:
facilitate deposition on a seafloor a line of cable sections extending in a first direction, the line of cable sections having a first end and a second end and comprising a plurality of cable sections aligned end-to-end in the first direction, the line of cable sections including a plurality of seismic wavefield receivers;
facilitate moving the line of cable sections by collecting cable sections from the second end of the line and depositing cable sections at the first end of the line so that the line of cable sections travels in the first direction; and
facilitate use of at least one source vessel to provide acoustical waveforms while the line of cable sections is moving, the acoustical waveforms received by the plurality of seismic wavefield receivers in the line of cable sections so as to enable generation of a seismic survey.

20. The non-transitory computer-readable medium of claim 19, wherein the instructions are further executable by the processor to:
balance a time used to provide acoustical waveforms by the at least one source vessel with a time required to move the line of cable sections.

21. The non-transitory computer-readable medium of claim 19, wherein the instructions are further executable by the processor to:
facilitate moving the at least one source vessel back-and-forth across the line of cable sections while providing the acoustical waveforms.

22. The non-transitory computer-readable medium of claim 21, wherein the instructions are further executable by the processor to:
facilitate moving the at least one source vessel a predetermined offset distance orthogonal to the line of cable sections.

23. The non-transitory computer-readable medium of claim 22, wherein the instructions are further executable by the processor to:
stagger the predetermined offset distances traveled by the at least one source vessel.

24. The non-transitory computer-readable medium of claim 23, wherein the instructions are further executable by the processor to:
balance a time used to provide acoustical waveforms by the at least one source vessel with a time required to move the line of cable sections by adjusting the staggering of the predetermined offset distances traveled by the at least one source vessel.

25. The non-transitory computer-readable medium of claim 23, wherein the instructions are further executable by the processor to:
facilitate use of at least two source vessels to provide acoustical waveforms while the line of cable sections is moving.

26. The non-transitory computer-readable medium of claim 23, wherein the instructions are further executable by the processor to:
balance a time used to provide acoustical waveforms by the at least two source vessels with a time required to move the line of cable sections by adjusting the staggering of the predetermined offset distances traveled by the at least one source vessel.

27. The non-transitory computer-readable medium of claim 19, wherein the instructions are further executable by the processor to:
balance a time used to provide acoustical waveforms by the at least one source vessel with a time required to move the line of cable sections by adjusting a number of source vessels used to provide acoustical waveforms and by staggering an offset distance traveled by each of the at least one source vessel while providing the acoustical waveforms.

28. The non-transitory computer-readable medium of claim 19, wherein the instructions are further executable by the processor to:
acquire three-dimensional image data for generation of the seismic survey while balancing a time used to provide acoustical waveforms by the at least one source vessel with a time required to move the line of cable sections.

* * * * *